May 16, 1944.　　　N. COMPARELLI　　　2,349,077
FISHING POLE
Filed Sept. 15, 1943
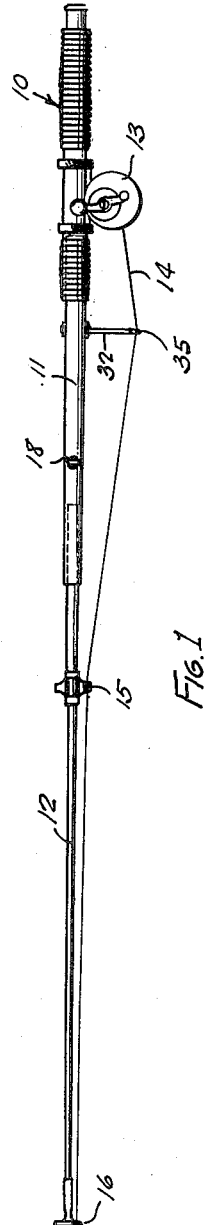
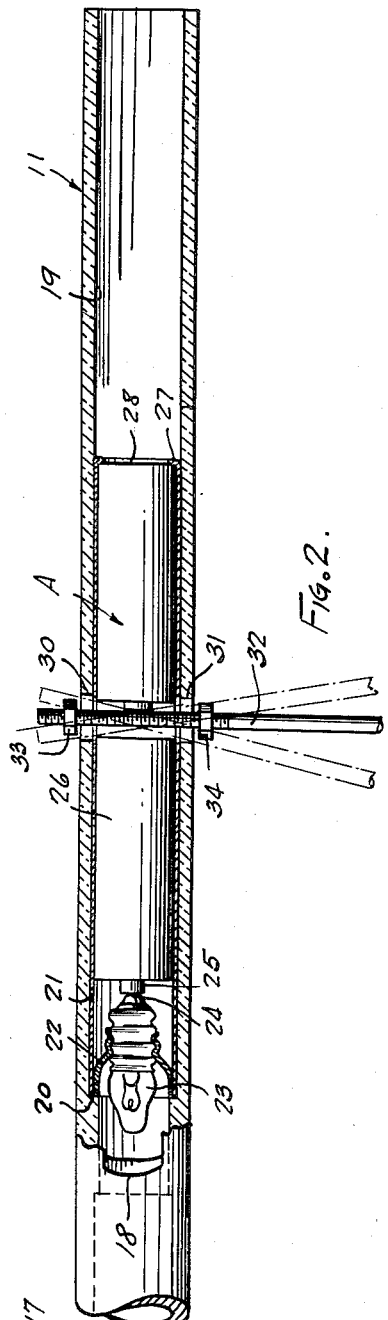
INVENTOR.
NICHOLAS COMPARELLI.
BY Patented May 16, 1944

2,349,077

UNITED STATES PATENT OFFICE 2,349,077

FISHING POLE

Nicholas Comparelli, Philadelphia, Pa.

Application September 15, 1943, Serial No. 502,446

3 Claims. (Cl. 43—17)

This invention relates to a fishing pole and is concerned primarily with a fishing pole that is peculiarly adapted for night fishing.

While fishing is a sport that is largely carried on during the daylight hours, many anglers prefer to fish at night. When it is considered that this preference is to be supplemented by those who must fish at night as a matter of convenience, it can well be recognized that there is a wide field to be supplied with equipment adapted for night fishing.

When fishing in the dark, it is, of course, highly difficult, if not impossible, for the fisherman to watch his pole, and he must depend entirely upon his feel. With the present-day equipment, this requires such intense concentration as to greatly detract from the pleasure of the sport. This condition has long been recognized, and many efforts have been made to provide a fishing pole with attachments for indicating or signaling, as by a light, when the fisherman has a "bite" or "nibble." Despite these several efforts to provide equipment which will satisfy this need, the fact remains that it has not been accepted by the fishing public. This lack of acceptance may be attributed to any of several causes. In the first place, the fishing laws of most States have stringent provisions against the use of lights in night fishing. When a light is not shielded, it attracts the fish and takes all sportsmanship out of the undertaking. Because of this, most States have legislated against the use of unshielded lights in night fishing with the result that many of the devices provided for the purpose of indicating when a fish bites or nibbles are objectionable as violating these statutes.

And thus again, many of the now known devices provided for this general purpose are so complicated as to discourage their use. In many instances, their addition or incorporation into the fishing equipment leaves such a bulky and unwieldy structure as to leave the fisherman with the preference to disregard and get along without them.

With these conditions in mind, this invention has in view, as its foremost objective, the provision of a fishing pole including highly simplified means for automatically indicating, as by a shaded light, when there is a tug on the fishing line. This idea is readily carried out with the conventional sectional fishing poles. A section is designed for incorporation into such a pole, and carries the improvement of this invention. The section is formed with a small aperture or window at the upper side through which the flash from a small electric bulb is visible. This bulb is assembled with a small dry cell battery assembly that is carried within the section, and a simple switch device is employed for causing the bulb to become illuminated when there is a tug on the line.

Various other more detailed objects and advantages of the invention, such as arise in connection with carrying out the above-noted thoughts in a practical embodiment, will in part become apparent and in part be hereinafter stated, as a description of the invention proceeds.

The invention, therefore, comprises a fishing pole including a section formed with an aperture, and which section houses a highly simplified bulb and battery assembly, together with means for causing illumination of the bulb when there is a tug on the fishing line.

For a full and more complete understanding of the invention, reference may be had to the following description and accompanying drawing, wherein:

Figure 1 is a view in side elevation of a fishing pole that is made in accordance with the precepts of this invention; and Figure 2 is an enlarged detailed sectional showing through a portion of the fishing pole section, which carries the improvement of this invention.

Referring now to the drawing, wherein like reference characters denote corresponding parts, and first more particularly to Figure 1, the complete fishing pole is shown as comprising a handle section 10, an intermediate section 11, and a thinner end section 12. The usual reel 13 is mounted on the handle section 10, and a line 14 is wound on this reel 13 in the usual manner. The end section 12 includes guides 15 and 16 through which this line passes in the usual manner. At the end of the line, there is a hook 17 which is intended to catch the fish in accordance with conventional practice. It may be noted that the section 11 is telescoped within the section 10 with a snug fit, and in turn, the end section 12 is telescopically fitted in the section 11.

The intermediate section 11 is provided with a small aperture or window, which is more clearly shown at 18 in Figure 1. Referring now particularly to Figure 2, the section 11 is shown as being of a cylindrical tubular formation, and in it is slidably fitted a bulb and battery assembly referred to in its entirety by the reference character A. It will be noted that the section 11 is formed with an enlarged bore 19 that terminates at a shoulder 20.

A cylinder 21 is snugly fitted in the bore 19 and abuts this shoulder 20. This insures of accurate positioning of the assembly A. The end of the cylinder 21 proximate to the shoulder 20 carries a socket member 22 in which is threaded a small electric bulb 23. This bulb 23 is substantially opposite to the aperture 18.

The bulb 23 includes a contact member 24 at its base, and a complemental contact member 25 is carried by a dry cell 26 that is fitted within the cylinder 21. One or more of the dry cells 26 may be employed. In the form of the invention illustrated in the drawing, two are shown, and the cylinder 21 is designed to accommodate this number in spaced relation to each other. At the end remote from the bulb 23, the cylinder 21 includes a base or end closure 27 in the form of a ring which provides an opening 28.

The section 11 is formed with diametrically opposite openings 30 and 31 which are opposite to the space between the dry cells 26. A rod 32 passes through these openings 30 and 31 and is adapted for limited swinging movement, as is clearly shown in Figure 2. The position of this rod is determined by nuts 33 and 34 which are screwed onto the threaded end portion of the rod 32.

As is brought out in Figure 1, the free end of the rod 32 takes the form of an eyelet 35, through which the line 14 passes.

With the device assembled as above described, and particularly with the line 14 passing through the eyelet 35, and the nuts 33 and 34 adjusted to permit a required amount of swinging movement on the part of the rod 32, it is believed that the operation becomes obvious. However, this operation may be briefly described by noting that when a fish nibbles or bites on the hook 17, there is a tug on the line 14. This causes a swinging of the rod 32, whereupon the rod 32 engages both of the dry cells 26 to complete the circuit, thus illuminating the lamp 23. The lighted condition of the lamp is visible through the aperture 18 and immediately advises the fisherman of the fact that he has a bite or nibble.

It is evident that the fishing pole including the section 11, as above described, is particularly adapted for night fishing. By simply removing the arm 32 and the assembly A, the fishing pole is adapted for ordinary daytime fishing. Thus, when a fishing pole is made in accordance with this invention, the purchaser of one of the poles needs acquire only a single pole for both day and night fishing. It is to be further noted that the highly simplified nature of the mechanism carried by the section 11, leaves the fishing pole with a minimum of protruding parts. All of the devices which adapt the pole for night fishing are included within the section 11, except for the protruding arm 32.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. In a sectional fishing pole carrying a line, a tubular section formed with an aperture, a battery and bulb assembly substantially opposite to said aperture, and means for causing illumination of said bulb coincident with a tug on said line.

2. In a sectional fishing pole carrying a line, a tubular section formed with an aperture, a bulb and battery assembly within said section, means to position said assembly to bring said bulb substantially opposite to said aperture, said assembly including a bulb formed with a contact and a dry cell formed with a complemental contact, and means cooperating with said line to complete the circuit of said contacts when there is a tug on said line.

3. A fishing pole of the character described, comprising a hand section, a reel on said hand section, a line carried by said reel, a tubular section telescopically fitted in said hand section and formed with an aperture, a battery and bulb assembly within said tubular section, means for positioning said assembly with the bulb substantially opposite to said aperture, said assembly including an electric bulb carrying a contact and a dry cell having a complemental contact, a second dry cell spaced from said first dry cell, and an arm mounted for swinging movement in said tubular section between said dry cells to complete the circuit of bulbs, said arm having an eyelet through which said line passes.

NICHOLAS COMPARELLI.